(12) United States Patent
Sugaya et al.

(10) Patent No.: US 11,250,960 B2
(45) Date of Patent: Feb. 15, 2022

(54) SENSOR DEVICE, METHOD OF PROCESSING SENSOR DEVICE, AND SENSOR NETWORK SYSTEM

(71) Applicant: SONY CORPORATION, Tokyo (JP)

(72) Inventors: Shigeru Sugaya, Kanagawa (JP); Sawako Kiriyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/769,580

(22) PCT Filed: Sep. 25, 2018

(86) PCT No.: PCT/JP2018/035301
§ 371 (c)(1),
(2) Date: Jun. 3, 2020

(87) PCT Pub. No.: WO2019/116670
PCT Pub. Date: Jun. 20, 2019

(65) Prior Publication Data
US 2021/0166824 A1   Jun. 3, 2021

(30) Foreign Application Priority Data
Dec. 14, 2017   (JP) ............................. JP2017-239579

(51) Int. Cl.
*G06F 15/16* (2006.01)
*G16Y 40/35* (2020.01)
(Continued)

(52) U.S. Cl.
CPC .............. *G16Y 40/35* (2020.01); *G16Y 40/10* (2020.01); *G16Y 40/20* (2020.01); *H04L 67/12* (2013.01)

(58) Field of Classification Search
CPC ........ G16Y 40/35; G16Y 40/10; G16Y 40/20; H04L 67/12
See application file for complete search history.

(56) References Cited

U.S. PATENT DOCUMENTS

2006/0176842 A1*   8/2006   Tamura .................. G01D 21/00
                                                    370/315
2017/0358201 A1*  12/2017   Govers ................ G05D 1/0248
2018/0276980 A1*   9/2018   Yukizane ............... H04M 11/04

FOREIGN PATENT DOCUMENTS

CN         1783823 A      6/2006
JP       2006-165695 A    6/2006
(Continued)

OTHER PUBLICATIONS

International Search Report and Written Opinion of PCT Application No. PCT/JP2018/035301, dated Nov. 6, 2018, 07 pages of ISRWO.

*Primary Examiner* — Normin Abedin
(74) *Attorney, Agent, or Firm* — Chip Law Group

(57) ABSTRACT

A plurality of sensor devices that senses environmental data at installation positions is appropriately arranged. Each sensor device includes a device detection unit, a position fixing unit, a sensor unit, and a transmission unit. The device detection unit performs operation of detecting another sensor device in the surrounding area and generates a detection result thereof. The position fixing unit fixes a position of the own sensor device on the basis of the detection result obtained by the device detection unit. The sensor unit senses environmental data at a position fixed by the position fixing unit. The transmission unit transmits the data sensed by the sensor unit.

18 Claims, 14 Drawing Sheets

(51) Int. Cl.
  *G16Y 40/10* (2020.01)
  *G16Y 40/20* (2020.01)
  *H04L 67/12* (2022.01)

(56) References Cited

FOREIGN PATENT DOCUMENTS

| | | |
|---|---|---|
| JP | 2012-014677 A | 1/2012 |
| JP | 2016-202184 A | 12/2016 |

\* cited by examiner

SENSOR DEVICE, METHOD OF PROCESSING SENSOR DEVICE, AND SENSOR NETWORK SYSTEM

CROSS REFERENCE TO RELATED APPLICATIONS

This application is a U.S. National Phase of International Patent Application No. PCT/JP2018/035301 filed on Sep. 25, 2018, which claims priority benefit of Japanese Patent Application No. JP 2017-239579 filed in the Japan Patent Office on Dec. 14, 2017. Each of the above-referenced applications is hereby incorporated herein by reference in its entirety.

TECHNICAL FIELD

The present technology relates to a sensor device. More specifically, the present technology relates to a sensor device that senses environmental data at an installation position, a method of processing the sensor device, and a sensor network system including the sensor device.

BACKGROUND ART

Sensor devices that sense environmental data at their installation positions have been used for acquiring environmental data at remote locations. It takes time and effort to install conventional sensor devices because the conventional sensor devices need human intervention to arrange them at positions at which sensor data are to be collected. Thus, sensors having a moving function have been proposed. For example, there has been proposed a self-propelled robot that is self-propelled in a poultry house and collects sensor data (e.g., see Patent Document 1).

CITATION LIST

Patent Document

Patent Document 1: Japanese Patent Application Laid-Open No. 2016-202184

SUMMARY OF THE INVENTION

Problems to be Solved by the Invention

In the above related art, data is collected within a specified range in the poultry house, and the collected data is taken out after the robot returns. However, in this related art, the way in which the robot is self-propelled is determined in advance, and a position at which data is collected is also set in advance. Thus, when data is collected by a plurality of sensors, it is necessary to identify data collection positions of other sensors in advance, make mutual adjustment with the other sensors, and then set a position of the own sensor. This setting is complicated, which is problematic.

The present technology has been made in view of such a circumstance, and an object thereof is to appropriately arrange a plurality of sensor devices that senses environmental data at installation positions.

Solutions to Problems

The present technology has been made in order to solve the above problems, and a first aspect thereof is a sensor device and a method thereof, the sensor device including: a device detection unit configured to perform operation of detecting another sensor device in a surrounding area and generate a detection result of the operation; a position fixing unit configured to fix a position of an own sensor device on the basis of the detection result; a sensor unit configured to sense environmental data at the position; and a transmission unit configured to transmit the sensed data. The first aspect makes it possible to fix the position of the own sensor device on the basis of the detection result of the another sensor device in the surrounding area and perform sensing.

Further, the first aspect may further include a position moving unit configured to move the position of the own sensor device on the basis of the detection result. Therefore, the sensor device can actively move. Further, in this case, the position moving unit may move until its moving amount reaches a predetermined moving amount.

Further, in the first aspect, in a case where the another sensor device does not exist in the surrounding area, the device detection unit may generate a detection result showing that the position of the own sensor device is to be fixed. Therefore, in a case where the another sensor device does not exist in the surrounding area, it is possible to fix the position of the own sensor device and perform sensing.

Further, in the first aspect, in a case where distribution density of the other sensor devices in the surrounding area is low, the device detection unit may generate a detection result showing that the position of the own sensor device is to be fixed. Therefore, in a case where the distribution density of the other sensor devices in the surrounding area is low, it is possible to fix the position of the own sensor device and perform sensing.

Further, in the first aspect, the device detection unit may detect whether or not the another sensor device exists in the surrounding area on the basis of a received electric field strength of a signal transmitted from the another sensor device in the surrounding area. Therefore, the another sensor device can be detected on the basis of the received electric field strength.

Further, in the first aspect, the device detection unit may perform operation of detecting the another sensor device in the surrounding area in accordance with an operation status of one or more of the other sensor devices having the same attribute as an attribute of the own sensor device. Therefore, the detection operation can be performed in accordance with the operation status of the other sensor devices having the same attribute as that of the own sensor device.

Further, in the first aspect, the device detection unit may generate a detection result of whether or not to fix the position of the own sensor device on the basis of identification information of the another sensor device. This makes it possible to fix the position of the own sensor device on the basis of the identification information of the another sensor device and perform sensing.

Further, in the first aspect, the device detection unit may generate a detection result of whether or not to fix the position of the own sensor device on the basis of installation times of the own sensor device and the another sensor device. This makes it possible to fix the position of the own sensor device on the basis of the installation times and perform sensing.

Further, in the first aspect, the device detection unit may generate a detection result of whether or not to fix the position of the own sensor device on the basis of a random number. This makes it possible to fix the position of the own sensor device on the basis of the random number and perform sensing.

Further, in the first aspect, the transmission unit may transmit, as a frame, a signal including information regarding a mounted sensor. In this case, the device detection unit may receive the signal transmitted as a frame from the another sensor device in the surrounding area and perform operation of detecting the another sensor device on the basis of information regarding a sensor included in the frame.

Further, in the first aspect, the transmission unit may transmit the data sensed at predetermined time intervals. This makes it possible to appropriately set a transmission timing.

Further, in the first aspect, the sensor unit may sense the data at predetermined time intervals. This makes it possible to appropriately set a sensing timing.

Further, in the first aspect, in a case where the device detection unit does not detect the another sensor device for a time period equal to or longer than a predetermined time interval, the device detection unit may generate a detection result showing that the another sensor device does not exist in the surrounding area.

Further, in the first aspect, in a case where a predetermined recheck date and time comes, the device detection unit may detect the another sensor device again.

Further, in the first aspect, the sensor unit may include at least one of a position detection sensor, a GPS sensor, a temperature sensor, a humidity sensor, a barometric pressure sensor, a sunshine sensor, an atmospheric component sensor, a pollutant sensor, a water amount sensor, or a water quality sensor.

Further, in the first aspect, the position fixing unit may include at least one of a mechanism for fixing an axle, a mechanism for fixing wheels, a fixing mechanism using a hook-and-loop fastener, a fixing mechanism using a protrusion, a fixing mechanism achieved by storing a movable portion, a fixing mechanism achieved by floating the movable portion, a fixing mechanism achieved by creating a vacuum state, a fixing mechanism achieved by cutting the movable portion, a fixing mechanism achieved by solidifying gas or liquid in the device, or a fixing mechanism achieved by solidifying particulate matter.

Further, in the first aspect, the position moving unit includes at least one of a moving mechanism using wheels, a moving mechanism using a material having a high friction coefficient, a moving mechanism achieved by floating, a moving mechanism using a fluidized substance, or a moving mechanism using particulate matter.

Further, a second aspect of the present technology is a sensor network system, in which, in a case where a second sensor device does not exist around a first sensor device, a position of the first sensor device is fixed, and the first sensor device collects data by sensing. This makes it possible to fix the position of the own sensor device at a position at which the another sensor device does not exists in the surrounding area and perform sensing.

Effects of the Invention

The present technology has an excellent effect of appropriately arranging a plurality of sensor devices that senses environmental data at installation positions. Note that the effect described herein is not necessarily limited, and may be any of the effects described in the present disclosure.

MODE FOR CARRYING OUT THE INVENTION

Hereinafter, a mode for carrying out the present technology (hereinafter, referred to as "embodiment") will be described. Description will be made in the following order.
1. Sensor network system
2. Sensor device
3. Overview of operation
4. Processing procedures
<1. Sensor network system>
[Configuration of Sensor Network System]
FIG. 1 illustrates a configuration example of a sensor network system according to an embodiment of the present technology.

Figure 1:
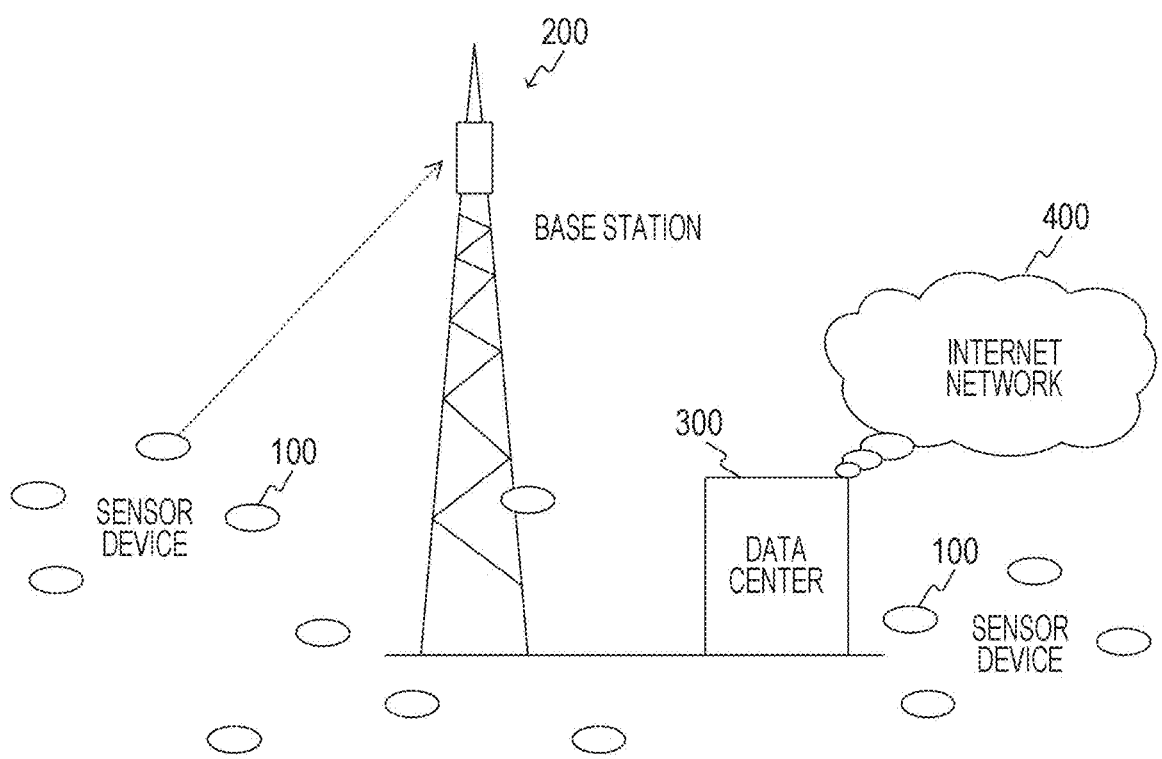
FIG. 1 illustrates a configuration example of a sensor network system according to an embodiment of the present technology.

In this sensor network system, a plurality of sensor devices 100 exists in a space as indicated by ellipses in FIG. 1, and data from the sensor devices 100 is collected by a base station 200 and is stored in a data center 300. Then, the data stored in the data center 300 is made public via an Internet network 400.

That is, in an environment where the plurality of sensor devices 100 exists in a space, environmental data measured by the sensor devices 100 is collected by the base station 200 via wireless transmission. Then, the data center 300 connected thereto gathers a large number of pieces of environmental data collected by the plurality of base stations 200 and processes the large number of pieces of environmental data into necessary information.

Each sensor device 100 includes a sensor that senses environmental data at a position at which the sensor device 100 is installed. The sensor device 100 has a function of transmitting the sensed data, and is also called Internet of Things (IoT) sensor or the like.

Each base station 200 receives and collects data transmitted from the sensor device 100. Therefore, the base station 200 is installed within a communication range of the sensor device 100. The base station 200 is connected to the data center 300, and the data collected by the base station 200 is stored in the data center 300.

The data center 300 collects the data collected by the base station 200. The data center 300 is connected to the Internet network 400, and can make the stored data public via the Internet network 400.

<2. Sensor Device>

[Configuration of Sensor Device]

Figure 2:
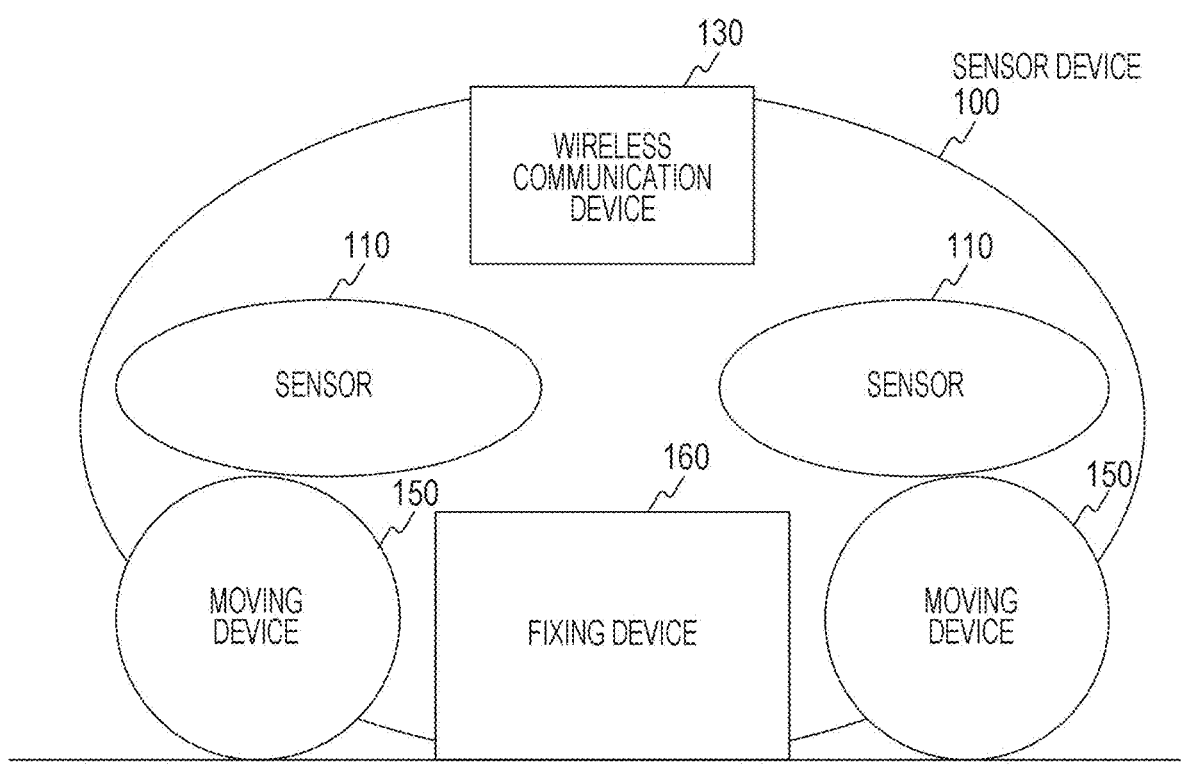
FIG. 2 illustrates an example of a main configuration of a sensor device 100 according to an embodiment of the present technology.

FIG. 2 illustrates an example of a main configuration of the sensor device 100 according to the embodiment of the present technology. The sensor device 100 includes sensors 110, a wireless communication device 130, moving devices 150, and a fixing device 160.

In this example, two sensors 110 are provided. One thereof is a sensor that collects position information such as latitude, longitude, and altitude where the sensor device 100 exists. Such a sensor is assumed to be, for example, a global positioning system (GPS) sensor.

The other is a sensor for measuring environmental data, and is assumed to be, for example, at least one of a temperature sensor, a humidity sensor, a barometric pressure sensor, a sunshine sensor, an atmospheric component sensor, a pollutant sensor, a water amount sensor, a water quality sensor, or the like. Note that, although this example shows an example in which one type of the latter environmental sensor is mounted, a single sensor device 100 may include a plurality of environmental sensors.

The wireless communication device 130 is a device that performs wireless communication. The wireless communication device 130 receives signals from other sensor devices 100. Further, the wireless communication device 130 transmits sensed data to the base station 200.

The moving device 150 is a device that moves a position of the sensor device 100. Herein, two moving devices 150 are illustrated because wheels are assumed. However, the moving devices 150 are realized in various modes as described later.

The fixing device 160 is a device that fixes the position of the sensor device 100. This fixing device 160 is also realized in various modes as described later.

Figure 3:
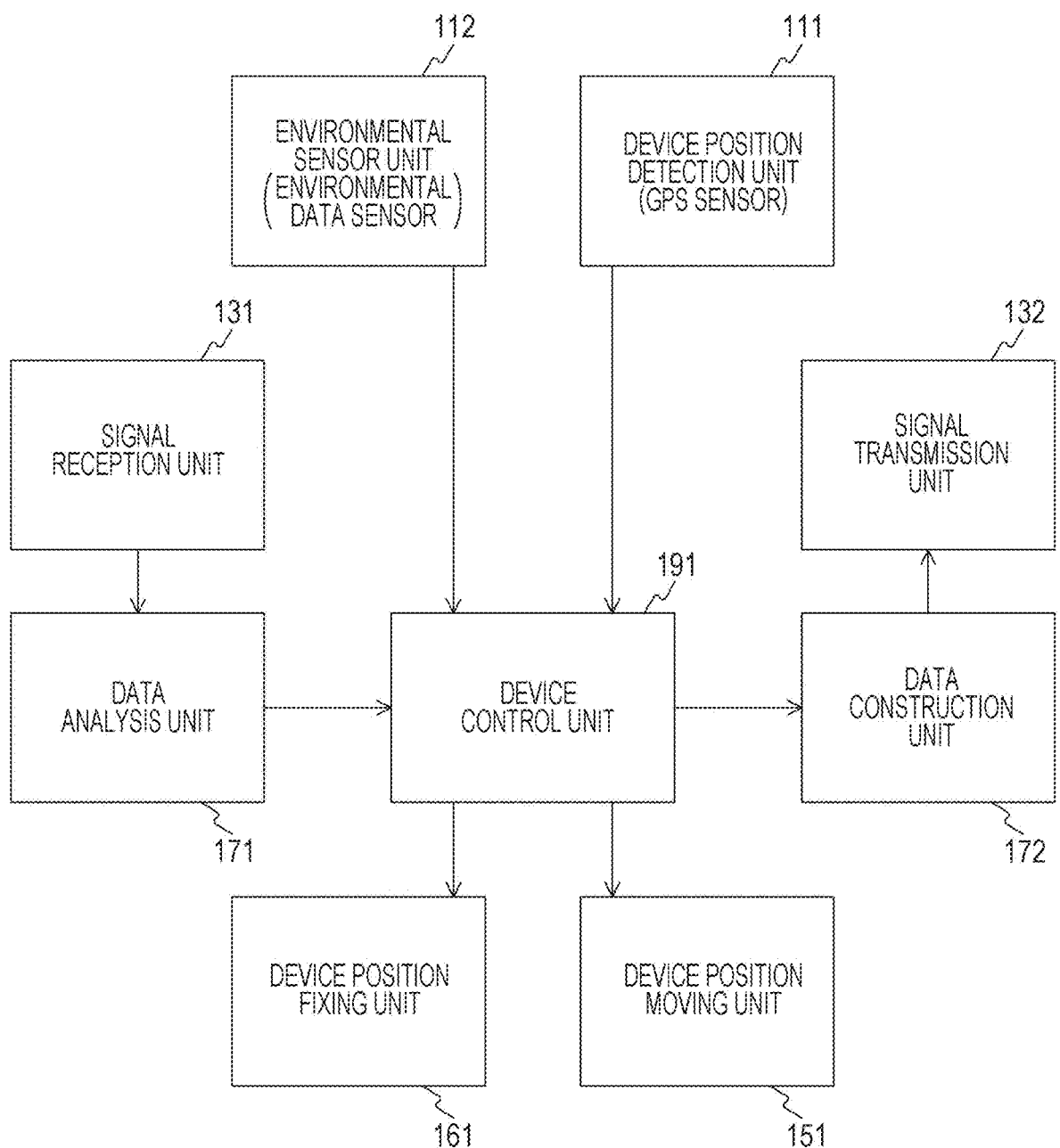
FIG. 3 illustrates an example of a functional configuration of a sensor device 100 according to an embodiment of the present technology.

FIG. 3 illustrates an example of a functional configuration of the sensor device 100 according to the embodiment of the present technology.

In this example, the sensor device 100 has all functions of a device position detection unit 111, an environmental sensor unit 112, a signal reception unit 131, a signal transmission unit 132, a device position moving unit 151, a device position fixing unit 161, a data analysis unit 171, a data construction unit 172, and a device control unit 191.

The device position detection unit 111 has a function of the sensor 110, and is a sensor that collects position information such as the latitude, the longitude, and the altitude where the sensor device 100 exists. That is, a GPS sensor is assumed.

The environmental sensor unit 112 has a function of the sensor 110, and is a sensor that measures environmental data at a position at which the sensor device 100 is installed.

The signal reception unit 131 has a function of the wireless communication device 130, and receives signals from other sensor devices 100.

The data analysis unit 171 analyzes the signals received from other sensor devices 100. That is, the data analysis unit 171 is a device detection unit that performs operation of detecting other sensor devices in the surrounding area and generates a detection result thereof.

The data construction unit 172 collects the data sensed by the device position detection unit 111 and the environmental sensor unit 112, information regarding the own sensor device 100, and the like and constructs the above data, information, and the like as a frame.

The signal transmission unit 132 has a function of the wireless communication device 130, and transmits the frame constructed by the data construction unit 172 to the base station 200.

The device position moving unit 151 has a function of the moving device 150, and moves the position of the sensor device 100.

The device position fixing unit 161 has a function of the fixing device 160, and is a device that fixes the position of the sensor device 100.

The device control unit 191 controls the entire sensor device 100.

[Frame Configuration]

Figure 4:
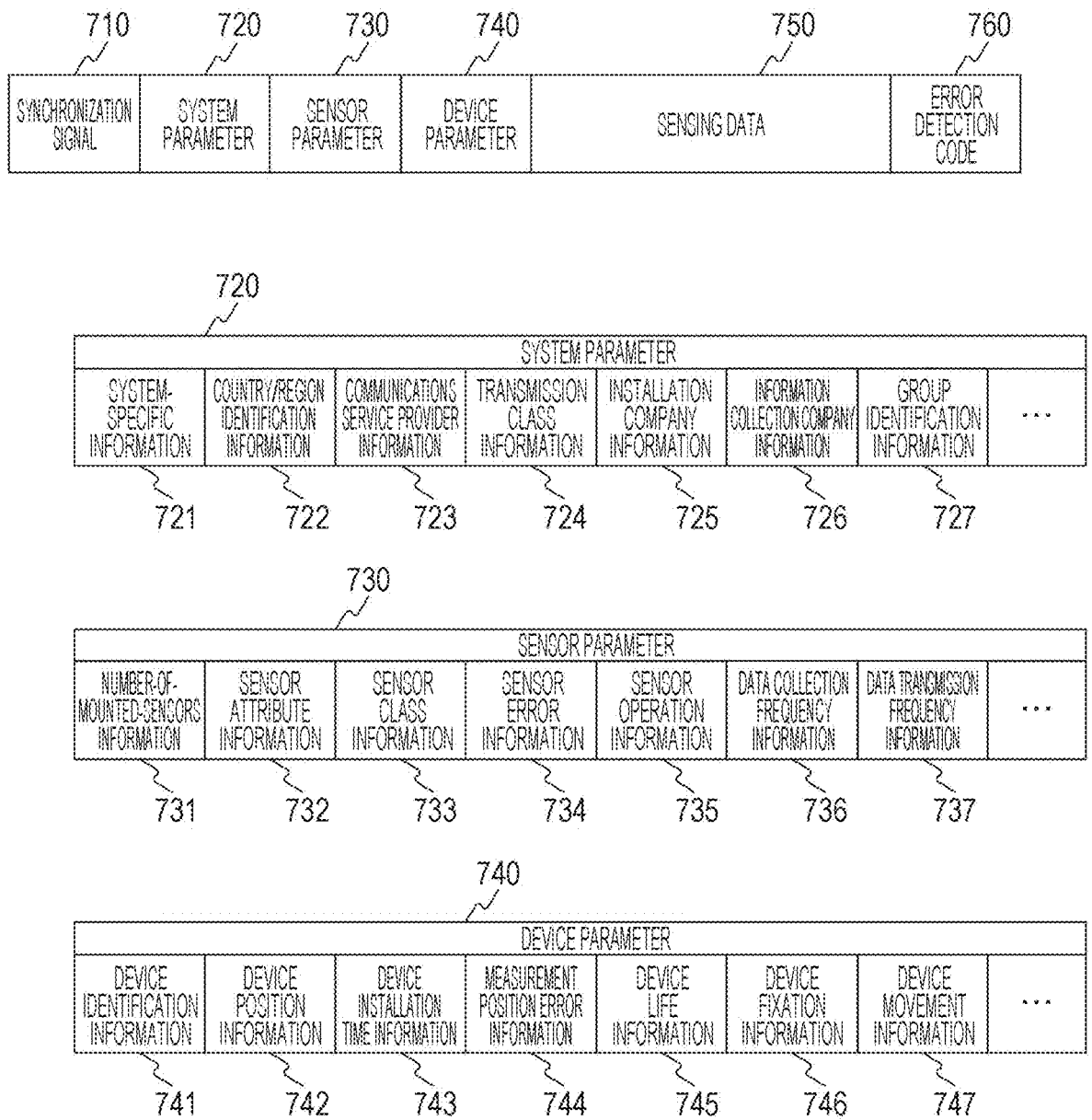
FIG. 4 illustrates an example of a frame configuration according to an embodiment of the present technology.

FIG. 4 illustrates an example of a frame configuration according to the embodiment of the present technology.

This frame includes a synchronization signal 710, a system parameter 720, a sensor parameter 730, a device parameter 740, sensing data 750, and an error detection code 760.

The synchronization signal 710 is a signal for establishing synchronization when the frame is received. For example, a predetermined preamble is used.

The system parameter 720 is a parameter indicating an attribute specific to the sensor device 100 that transmits this frame. Specifically, the system parameter 720 includes a system-specific information 721 serving as an identifier specific to this wireless communication system, a country/region identification information 722 indicating a country or region where this communication system is operated, and communications service provider information 723 for identifying a company that operates the communication system. Further, the system parameter 720 also includes transmission class information 724 in which parameters such as the maximum transmission power class in the communication system are written, installation company information 725 for identifying a company that has installed the sensor device 100, and information collection company information 726 for identifying a company that collects information regarding the sensor device 100. Further, the system parameter 720 also includes group identification information 727 for identifying a group of the sensor device 100.

The sensor parameter 730 is a parameter indicating information specific to the sensor 110 mounted on the sensor device 100 that transmits this frame. Specifically, the sensor parameter 730 includes number-of-mounted-sensors information 731 indicating the number of mounted sensors, and, in a case where a plurality of sensors is mounted, the following parameters are individually set in accordance with the written number of sensors. That is, the sensor parameter 730 includes, as parameters indicating an attribute of the mounted sensor, sensor attribute information 732, sensor class information 733 indicating parameters such as sensitivity of the mounted sensor, and sensor error information 734 indicating errors and accuracy of the sensor. Further, the sensor parameter 730 also includes sensor operation information 735 indicating whether or not the sensor operates, data collection frequency information 736 indicating a frequency of collecting data, data transmission frequency information 737 indicating a frequency of transmitting the collected data, and the like.

The device parameter 740 is collection of information regarding the sensor device 100 that transmits this frame. Specifically, the device parameter 740 includes device identification information 741 for identifying a device such as a device address and device position information 742 indicating the position of the sensor device 100 as information of latitude, longitude, and altitude detected from the GPS sensor or the like. Further, the device parameter 740 also includes device installation time information 743 indicating time related to a timing at which the sensor device 100 is installed at a current position, and measurement position error information 744 indicating an error of the position measured by the sensor device 100. Further, the device parameter 740 also includes device life information 745 of the sensor device 100 calculated backward on the basis of the remaining battery power and the like, device fixation information 746 indicating that the sensor device 100 operates at a fixed position, device movement information 747 indicating that the sensor device 100 is movable, and the like.

The sensing data 750 is data sensed by the sensors 110.

The error detection code 760 is a code for performing error detection when the frame is received. For example, a cyclic redundancy check (CRC) or the like is assumed.

[Fixation of Device Position]

FIGS. 5A, 5B, 5C, and 5D illustrate an example of a device position fixing mode according to the embodiment of the present technology.

Figure 5A:
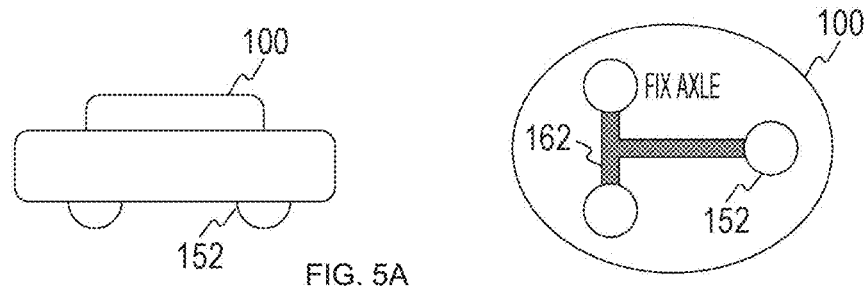
FIGS. 5A, 5B, 5C, and 5D illustrate an example of a device position fixing mode according to an embodiment of the present technology.

There are various modes for fixing the position of the sensor device 100 as described above. First, as illustrated in FIG. 5A, in a case where wheels 152 are used as the device position moving unit 151 in the sensor device 100, a mechanism for fixing a movable axle 162 may be adopted. With this mechanism, the position of the sensor device 100 is fixed.

Figure 5B:
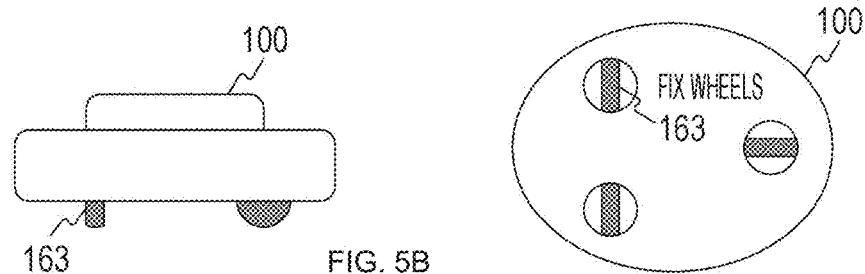

Further, as illustrated in FIG. 5B, a mechanism 163 for fixing the movable wheels 152 may be adopted. With this mechanism, the position of the sensor device 100 is fixed.

Figure 5C:
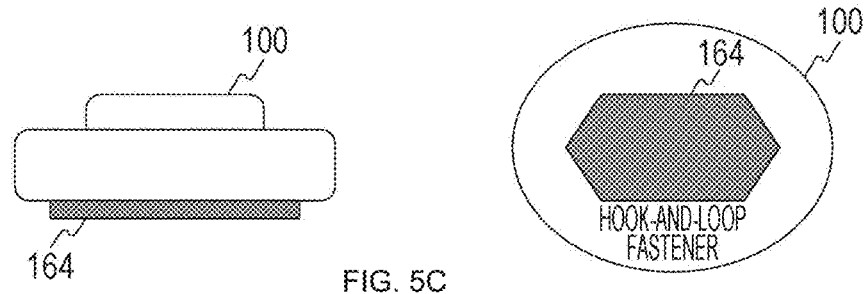

Further, as illustrated in FIG. 5C, a hook-and-loop fastener 164 may be provided on a lower surface of the sensor device 100 to be fixed on cloth or the like. With this mechanism, the position of the sensor device 100 is fixed.

Figure 5D:
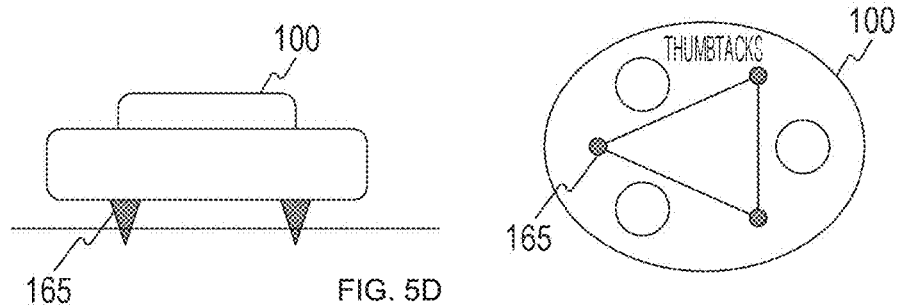

Further, as illustrated in FIG. 5D, protrusions 165 such as thumbtacks or spikes may protrude from the lower surface of the sensor device 100. With this mechanism, the position of the sensor device 100 is fixed.

Figure 6A:
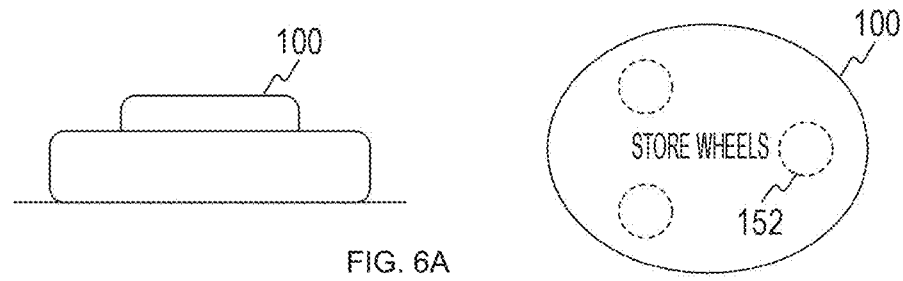
FIGS. 6A, 6B, and 6C illustrate another example of a device position fixing mode according to an embodiment of the present technology.
Figure 6B:
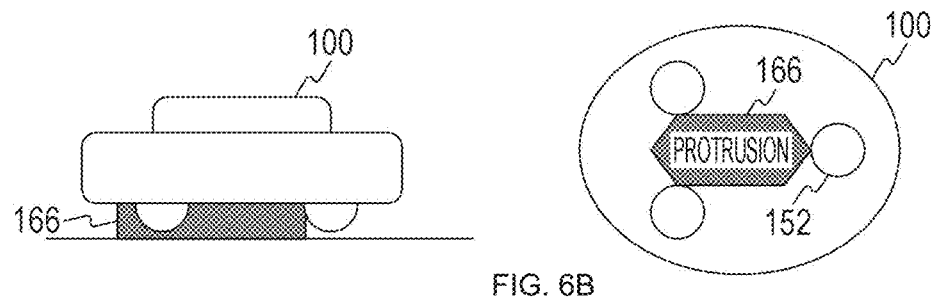
Figure 6C:
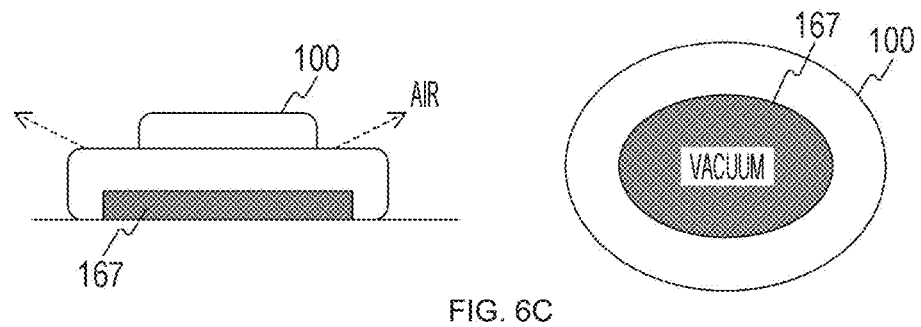

FIGS. 6A, 6B, and 6C illustrate another example of the device position fixing mode according to the embodiment of the present technology.

As illustrated in FIG. 6A, the wheels 152 that are movable portions may be stored. With this mechanism, the position of the sensor device 100 is fixed.

Further, as illustrated in FIG. 6B, a protrusion 166 may protrude so as to float the wheels 152 that are movable portions. With this mechanism, the position of the sensor device 100 is fixed.

Further, as illustrated in FIG. 6C, air may be discharged from a lower part of a main body to put inside 167 in a vacuum state. With this mechanism, the position of the sensor device 100 is fixed.

Figure 7:
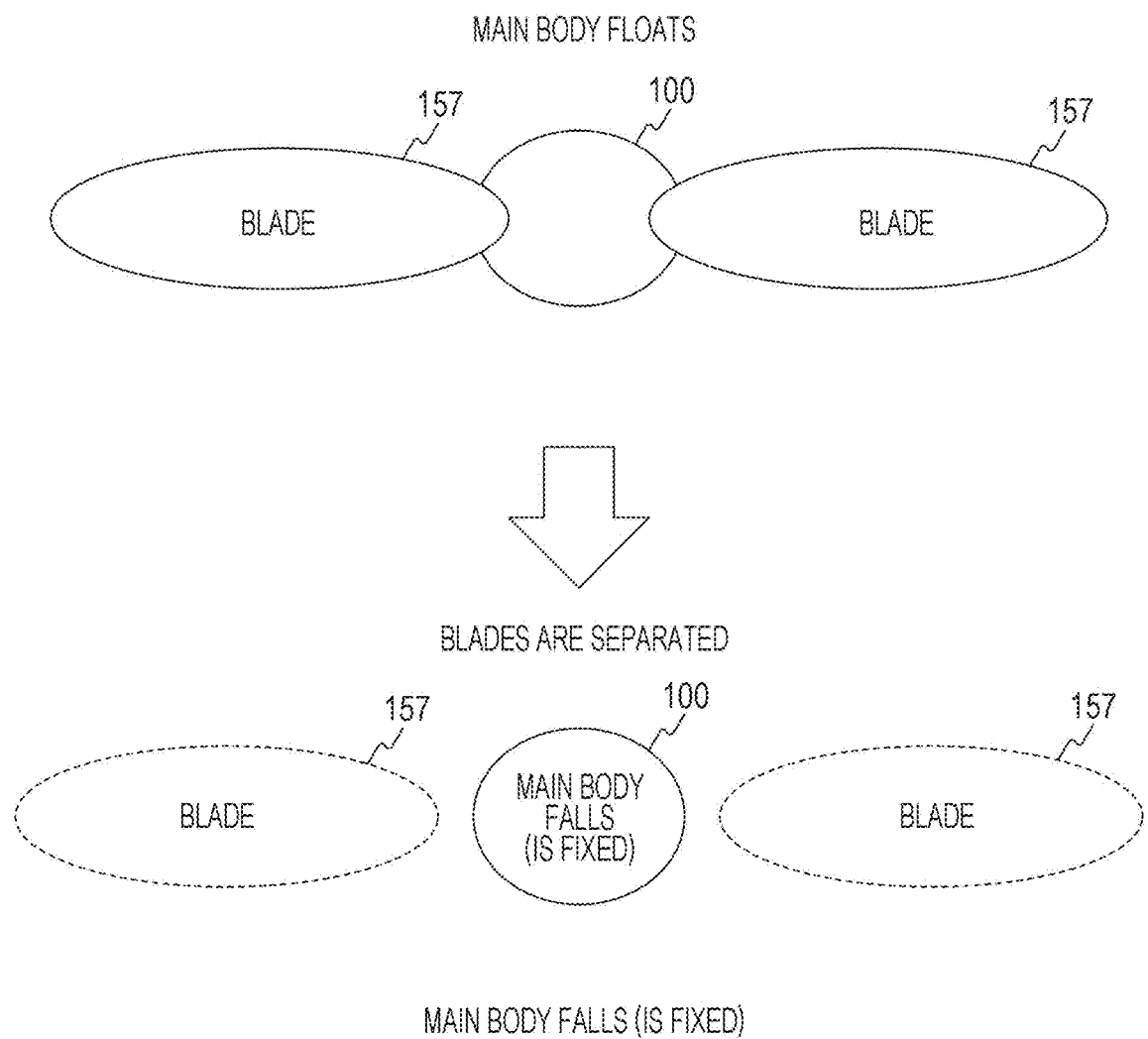
FIG. 7 illustrates another example of a device position fixing mode according to an embodiment of the present technology.

FIG. 7 illustrates another example of the device position fixing mode according to the embodiment of the present technology.

In FIG. 7, blades 157 that are movable portions are provided as the device position moving unit 151 in the main body of the sensor device 100, and the main body is floated by those blades. In this case, if the blades 157 are cut off to be separated, the sensor device 100 falls at that position. With this mechanism, the position of the sensor device 100 is fixed.

Figure 8A:
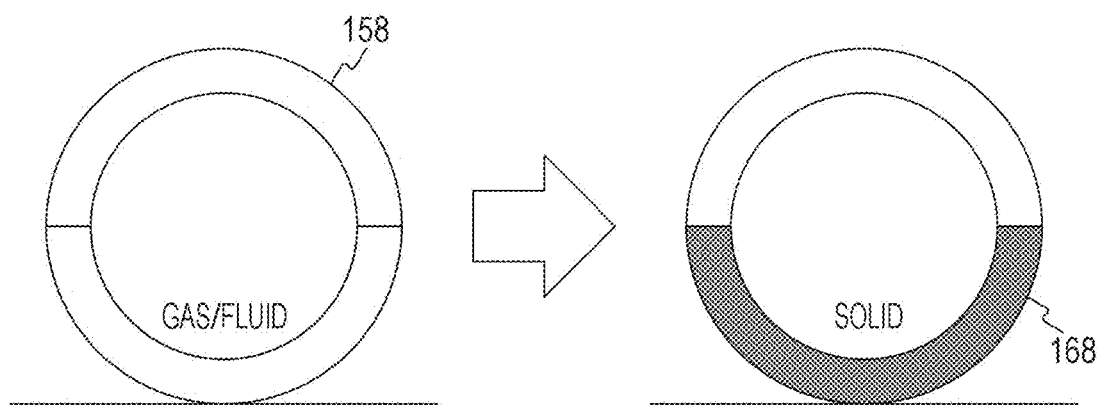
FIGS. 8A and 8B illustrate another example of a device position fixing mode according to an embodiment of the present technology.
Figure 8B:
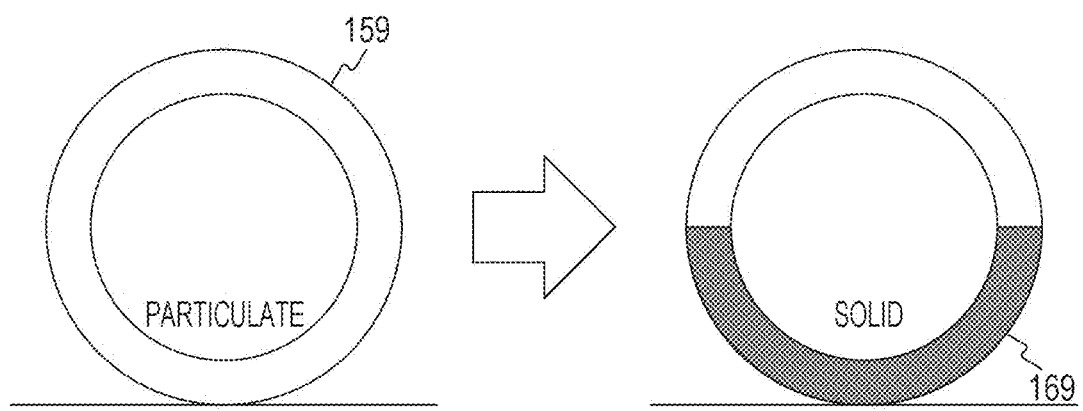

FIGS. 8A and 8B illustrate another example of the device position fixing mode according to the embodiment of the present technology.

As illustrated in FIG. 8A, in a case where the sensor device 100 has a spherical shape, gas or liquid is sealed in a peripheral portion 158 thereof. The gas or liquid is in a flowing state, and thus the sensor device 100 can freely move. As to this, the gas or liquid may be solidified by freezing or the like to be formed into a solid 168 object. Therefore, the position of the sensor device 100 is fixed due to a weight thereof.

Further, as illustrated in FIG. 8B, a peripheral portion 159 of the spherical sensor device 100 is filled with a particulate object. The particulate object is in a flowing state, and the sensor device 100 can freely move. As to this, the particulate object may be solidified by freezing or the like to be formed into a solid 169 object. Therefore, the position of the sensor device 100 is fixed due to a weight thereof.

[Movement of Device Position]

FIGS. 9A, 9B, 9C, and 9D illustrate an example of a device position moving mode according to the embodiment of the present technology.

Figure 9A:
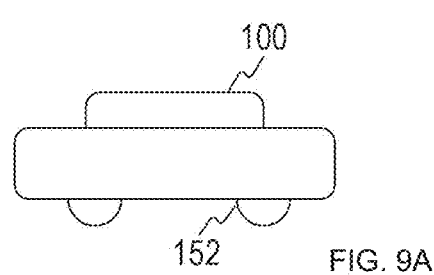
FIGS. 9A, 9B, 9C, and 9D illustrate an example of a device position moving mode according to an embodiment of the present technology.
Figure 9A:
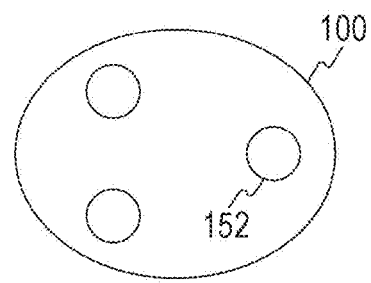

There are various modes for moving the position of the sensor device 100 as described above. First, as illustrated in FIG. 9A, at least three spherical wheels 152 may be attached to the lower part of the main body. Therefore, the position of the sensor device 100 can be moved.

Figure 9B:
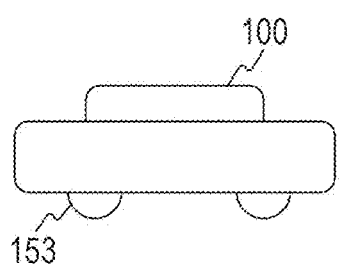
Figure 9B:
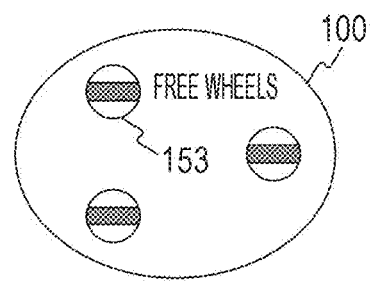

Further, as illustrated in FIG. 9B, at least three wheels 153 whose direction is freely changeable may be attached to the lower part of the main body. Therefore, the position of the sensor device 100 can be moved.

Figure 9C:
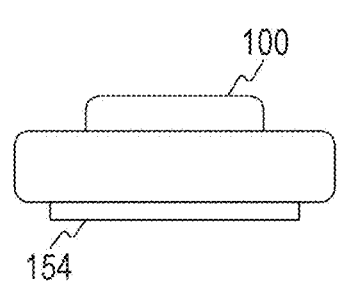
Figure 9C:
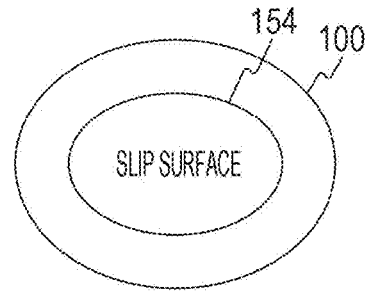

Further, as illustrated in FIG. 9C, a slip surface 154 may be arranged on the lower part of the main body as a material having a low friction coefficient, for example. Therefore, the position of the sensor device 100 can be moved.

Figure 9D:
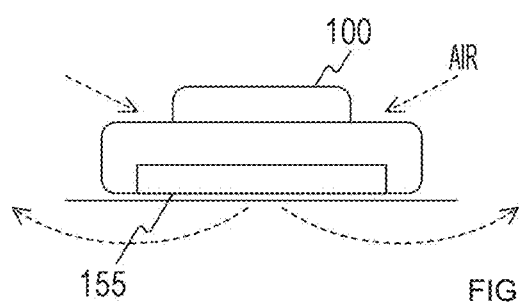
Figure 9D:
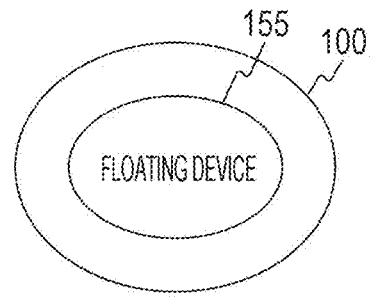

Further, as illustrated in FIG. 9D, a structure may be made floatable by discharging air from the lower part of the main body. Therefore, the position of the sensor device 100 can be moved.

Note that the device position moving modes described in the above device position fixing modes are not illustrated herein. However, there are some possible examples, including an example of a structure in which the sensor device can be floated by movable portions such as blades attached to the main body, an example of a structure in which the sensor device can be moved by sealing gas or liquid in the peripheral portion of the spherical main body and causing the gas or liquid to flow, an example of a structure in which the sensor device can be moved by filling the peripheral portion of the spherical main body with particulate matter and causing the particulate matter to flow, and the like.

Herein, the device position fixing modes have been described. However, for example, the sensor device may be a device that is passively moved, such as a device moved by being kicked by a person or animal, a device drifting in the air with blades, or a device carried downstream by rain.

<3. Overview of Operation>

Figure 10:
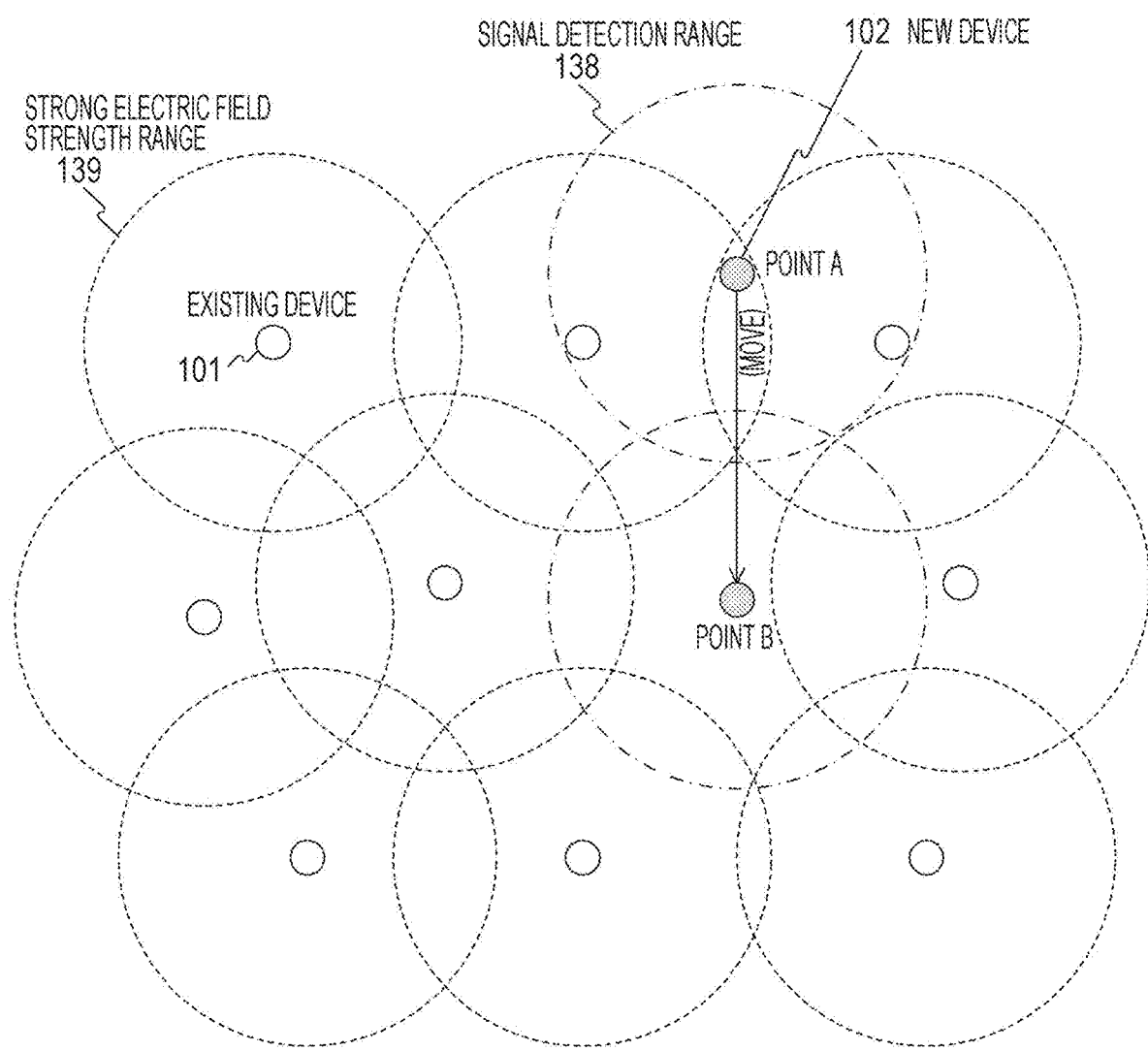
FIG. 10 illustrates a state of an installation example of a sensor device 100 according to an embodiment of the present technology.

FIG. 10 illustrates a state of an installation example of the sensor device 100 according to the embodiment of the present technology. Note that, in the following example, the sensor devices 100 that have already been arranged, which are indicated by white circles in FIG. 10, will be referred to as "existing devices 101", and a sensor device 100 that is newly arranged will be referred to as "new device 102".

Herein, FIG. 10 illustrates a situation in which the new device 102 starts operation in a space where the existing devices 101 are densely distributed. The dotted line surrounding each existing device 101 indicates a range 139 of a strong electric field strength of a signal transmitted by the device. Further, the chain line surrounding the new device 102 indicates a signal detection range 138 of a signal having a strong level.

First, at a point A, the new device 102 falls within the ranges 139 of the strong electric field strength of the surrounding existing devices 101 and receives signals from the surrounding existing devices 101 in the signal detection range 138. Thus, the new device 102 does not start operation at this position.

Then, when the new device 102 moves in a direction of the arrow to reach a point B, the new device 102 is out of the ranges 139 of the strong electric field strength of the surrounding existing devices 101 and does not receive signals from the surrounding existing devices 101 in the signal detection range 138. Thus, it is determined that no existing device 101 exists at this position, and the new device 102 is fixed at this position and starts operation of the sensor.

That is, in a case where it is detected that no existing device 101 exists around the new device 102, the new device 102 can be fixed by the fixing device 160 so as to stay at the position, operate the sensor 110 to collect environmental data, and wirelessly transmit the data.

Figure 11:
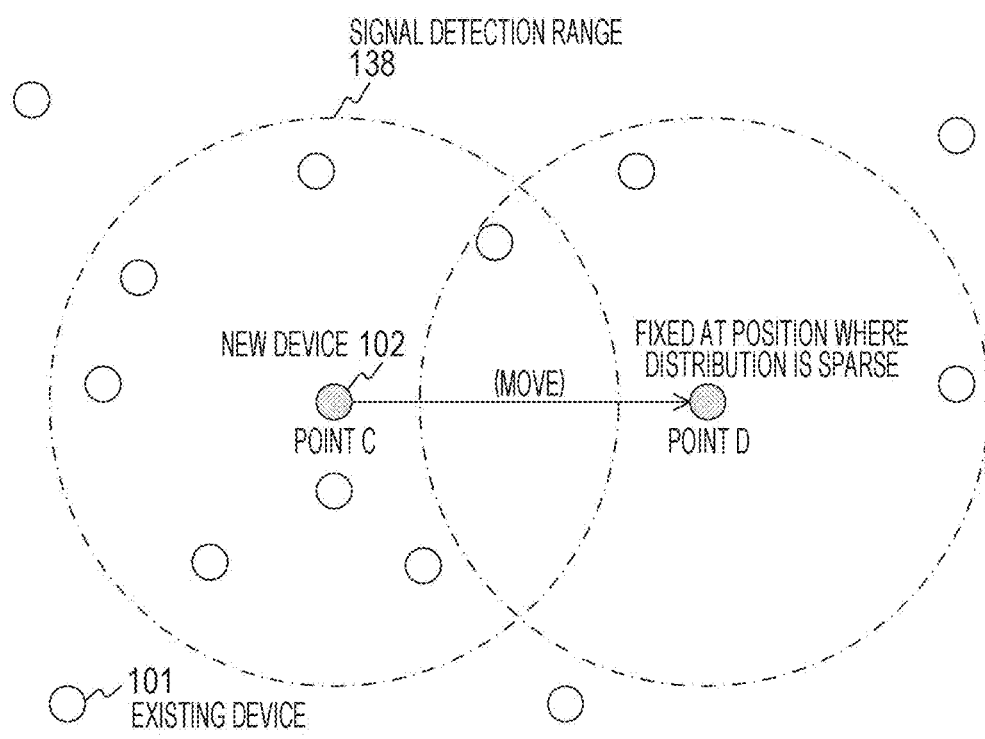
FIG. 11 illustrates a state of another installation example of a sensor device 100 according to an embodiment of the present technology.

FIG. 11 illustrates a state of another installation example of the sensor device 100 according to the embodiment of the present technology.

Herein, FIG. 11 illustrates a situation in which the new device 102 starts operation in a space where the existing devices 101 indicated by white circles in FIG. 11 are densely distributed. First, at a point C, the new device 102 receives signals from seven surrounding existing devices 101. Thus, the new device 102 does not start operation at this position.

Then, when the new device 102 moves in a direction of the arrow to reach a point D, the new device 102 can detect signals only from three surrounding existing devices 101. Thus, it is determined that distribution of the existing devices 101 is sparse at this position, and the new device 102 is fixed at this position and operates the sensors.

That is, in a case where, even if the existing devices 101 already exist therearound, density of the existing devices 101 existing in the space is low, the new device 102 can also stay at that position.

Note that, in those installation examples, in a case where, even if an operation position is once determined, scanning is performed in a space around the new device 102 and a new existing device 101 is detected, the new device 102 may start moving again to move to a position at which no existing device 101 exists therearound and operate.

Further, the distribution becomes sparse also in a case where a battery of the existing device 101 runs out or in a case where the existing device 101 does not transmit a signal because of a malfunction. Thus, when the new device 102 moves to that position, it is possible to thoroughly collect information from the environmental sensor.

Further, in a case where predetermined recheck date and time, such as once a day or once a week, comes as a frequency of checking whether or not to move, the new device 102 may check presence or absence of the sensor devices 100 in the surrounding area and determine whether or not to move each time.

Further, regarding a moving amount at the time of moving, the new device 102 may move until its moving amount reaches a predetermined moving amount. Further, the new device 102 may move in a predetermined area.

<4. Processing Procedures>

Figure 12:
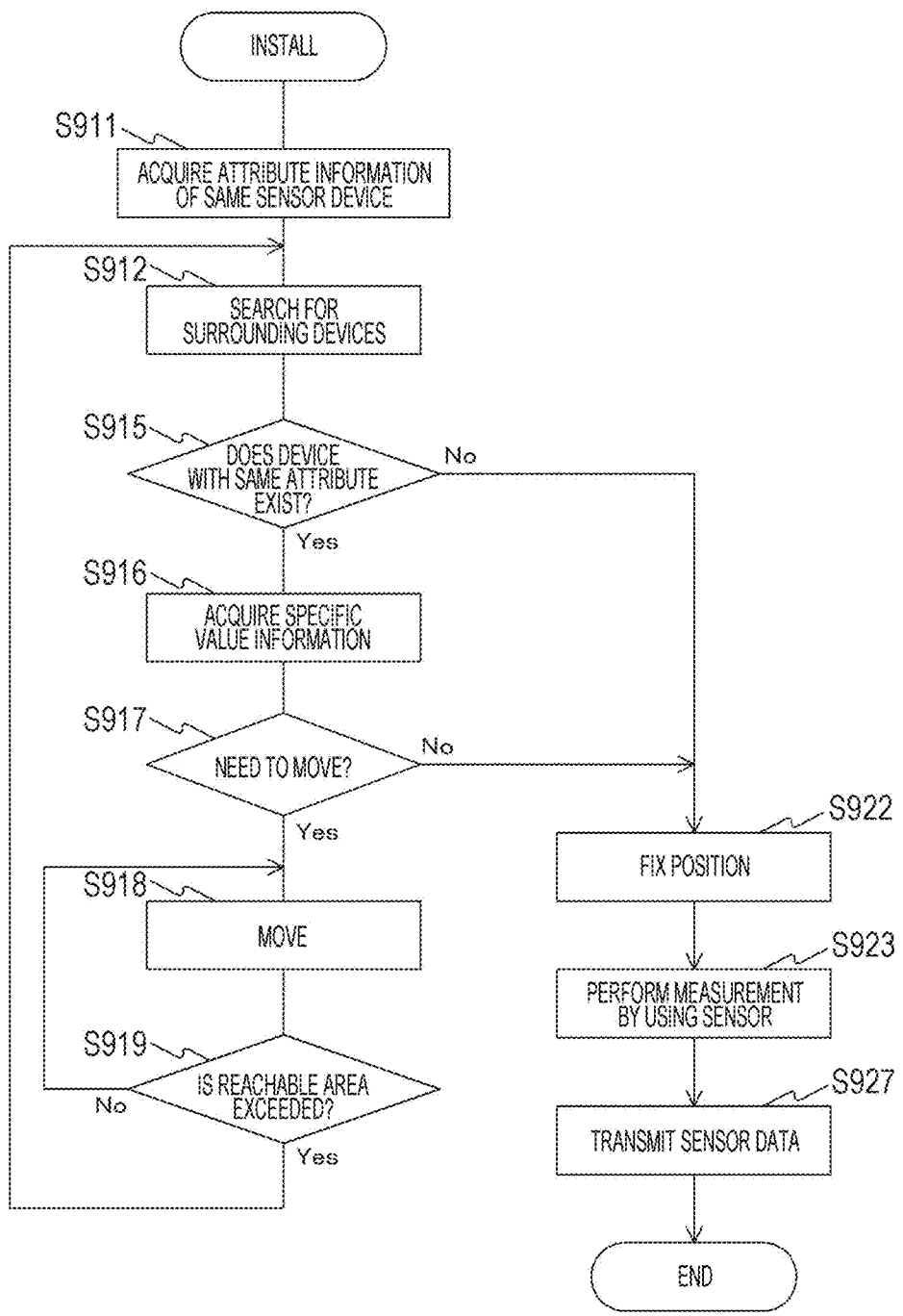
FIG. 12 is a flowchart showing a processing procedure of a first installation example of a sensor device 100 according to an embodiment of the present technology.

FIG. 12 is a flowchart showing a processing procedure of a first installation example of the sensor device 100 according to the embodiment of the present technology. The first installation example shows basic operation of fixing a position in a predetermined area and performing sensing. Note that, in the following example, the own sensor device 100 will be referred to as "own device 103", and other sensor devices 100 will be referred to as "other devices 104".

First, the own device 103 acquires the same attribute information of the sensor device 100 as that of the own device 103 (step S911). Then, the own device 103 carries out a search to determine whether or not other devices 104 having the attribute information exist therearound (step S912). That is, in a case where the own device 103 acquires attribute information indicated in a frame of data that is wirelessly transmitted and receives a signal of the sensor device 100 having the same attribute as that of the own device at a strong level equal to or higher than a predetermined received electric field strength (step S915: Yes), the own device 103 identifies existence thereof.

When the own device 103 identifies existence of the other devices 104 having the same attribute as that of the own device, the own device 103 acquires specific value information (step S916) and determines whether or not to move (step S917). The specific value information is assumed to be, for example, device identification information, device installation time information, and the like. Assuming the device identification information, in a case where there is device identification information of another new device 104 that has not been recognized so far, the own device 103 may determine not to move because the own device 103 has been at that position for a longer time. Further, assuming the device installation time information, in a case where the device installation time information of the own device 103 is older than that of the other devices 104, the own device 103 may determine not to move. Further, a random number may be generated, and the own device 103 may determine whether or not to move in accordance with a value thereof.

As a result, in a case where it is determined that the own device 103 needs to move (step S917: Yes), the own device 103 performs moving operation (step S918). This moving operation is performed until the own device 103 exceeds a range of a predetermined reachable area (step S919: No). Note that, when the own device 103 finishes moving (step S919: Yes), the own device 103 searches for a device in the surrounding area again (step S912).

Meanwhile, in a case where the other devices 104 having the same attribute do not exist (step S915: No) or in a case where it is determined that the own device 103 does not need to move (step S917: No), a position of the own device 103 is fixed (step S922). Then, the own device 103 starts operation as the sensor device 100, and measures environmental data by using the sensor 110 (step S923). The measured environmental data is transmitted by the signal transmission unit 132 (step S927).

Figure 13:
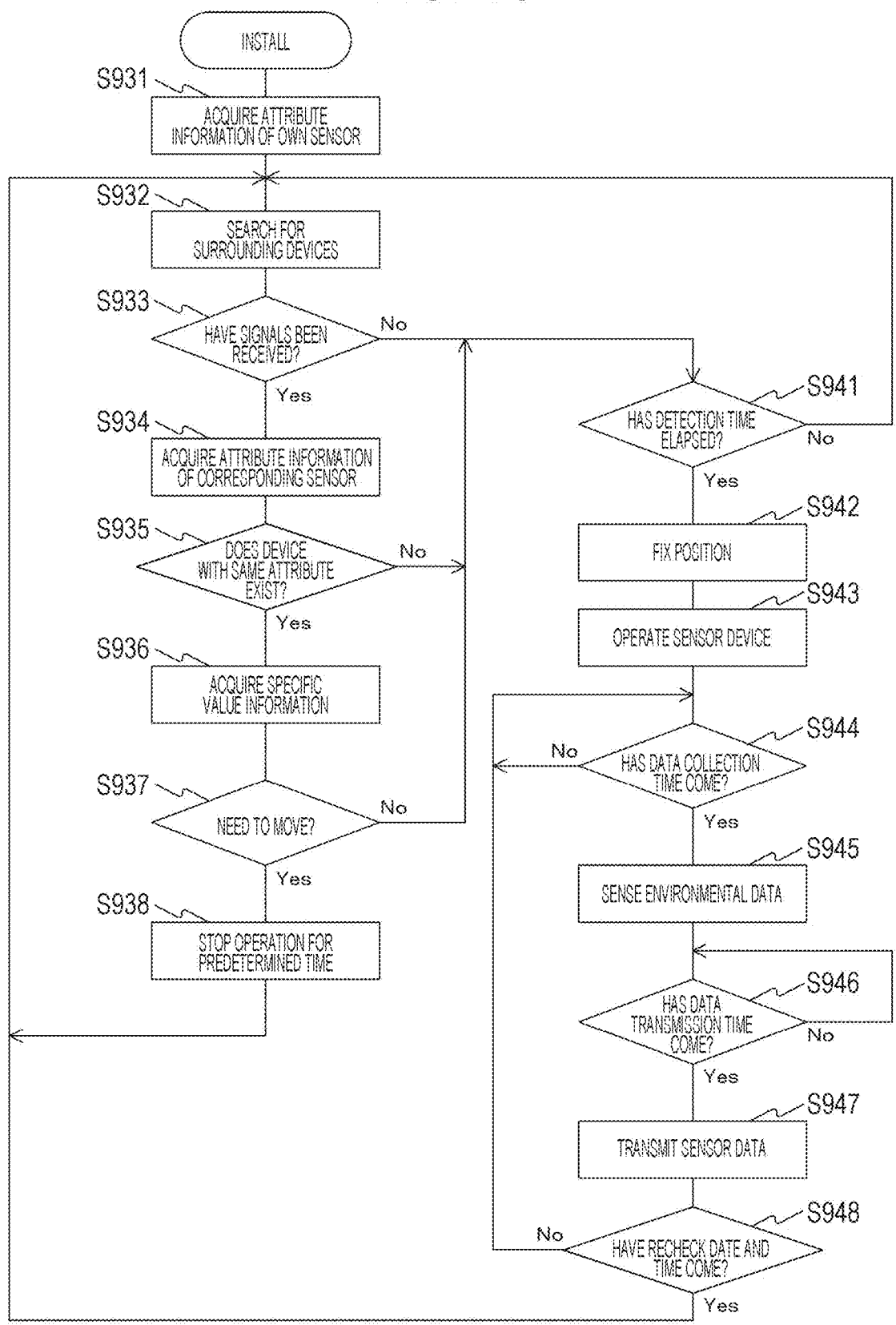
FIG. 13 is a flowchart showing a processing procedure of a second installation example of a sensor device 100 according to an embodiment of the present technology.

FIG. 13 is a flowchart showing a processing procedure of a second installation example of the sensor device 100 according to the embodiment of the present technology. The second installation example shows a case in which the sensor device 100 passively moves and operates.

First, the own device 103 acquires the same attribute information of the sensor device 100 as that of the own device 103 (step S931). Then, the own device 103 carries out a search by operating the signal reception unit 131 to receive signals transmitted from the other devices 104 therearound (step S932).

Herein, in a case where the signal reception unit 131 receives the signals (step S933: Yes), the own device 103 acquires attribute information of the other devices 104 included in a frame thereof (step S934), and determines whether or not the attribute information is the same as that of the own device 103 (step S935).

When the own device 103 identifies existence of the other devices 104 having the same attribute as that of the own device 103, the own device 103 acquires specific value information (step S936) and determines whether or not to move (step S937). This determination on whether or not to move based on the specific value information is similar to that in the first installation example described above, and thus description thereof is omitted.

As a result, in a case where it is determined that the own device 103 needs to move (step S937: Yes), the own device 103 stops operation for predetermined time (step S938) and, then, searches for other devices 104 in the surrounding area again (step S932). The own device 103 passively moves during this time, and repeats the above operation at a new position. Note that this stopping time may be determined by assuming time required for passive movement.

Meanwhile, in a case where the own device 103 does not receive signals from the other devices 104 (step S933: No), in a case where the other devices 104 having the same attribute do not exist (step S935: No), or in a case where it is determined that the own device 103 does not need to move (step S937: No), the following processing is performed. That is, the own device 103 continues a search for other devices 104 in the surrounding area again (step S932) until predetermined detection time elapses (step S941: No). When the predetermined detection time has elapsed (step S941: Yes), the position of the own device 103 is fixed (step S942). Then, the own device 103 starts operation as the sensor device 100, and measures environmental data by using the sensor 110 (step S943).

Then, when a data collection timing comes (step S944: Yes), the own device 103 senses environmental data by using the sensor 110 (step S945). Then, when a data transmission timing comes (step S946: Yes), the own device 103 transmits the collected sensor data (step S947). Thereafter, the own device 103 senses data (step S945) every time when the data collection timing comes (step S944: Yes), and transmits the data (step S947) every time when the data transmission timing comes (step S946: Yes).

Furthermore, when the recheck date and time at which the own device 103 determines whether or not to move comes (step S948: Yes), the own device 103 carries out a search again by receiving signals transmitted from the other devices 104 existing therearound (step S932).

Figure 14:
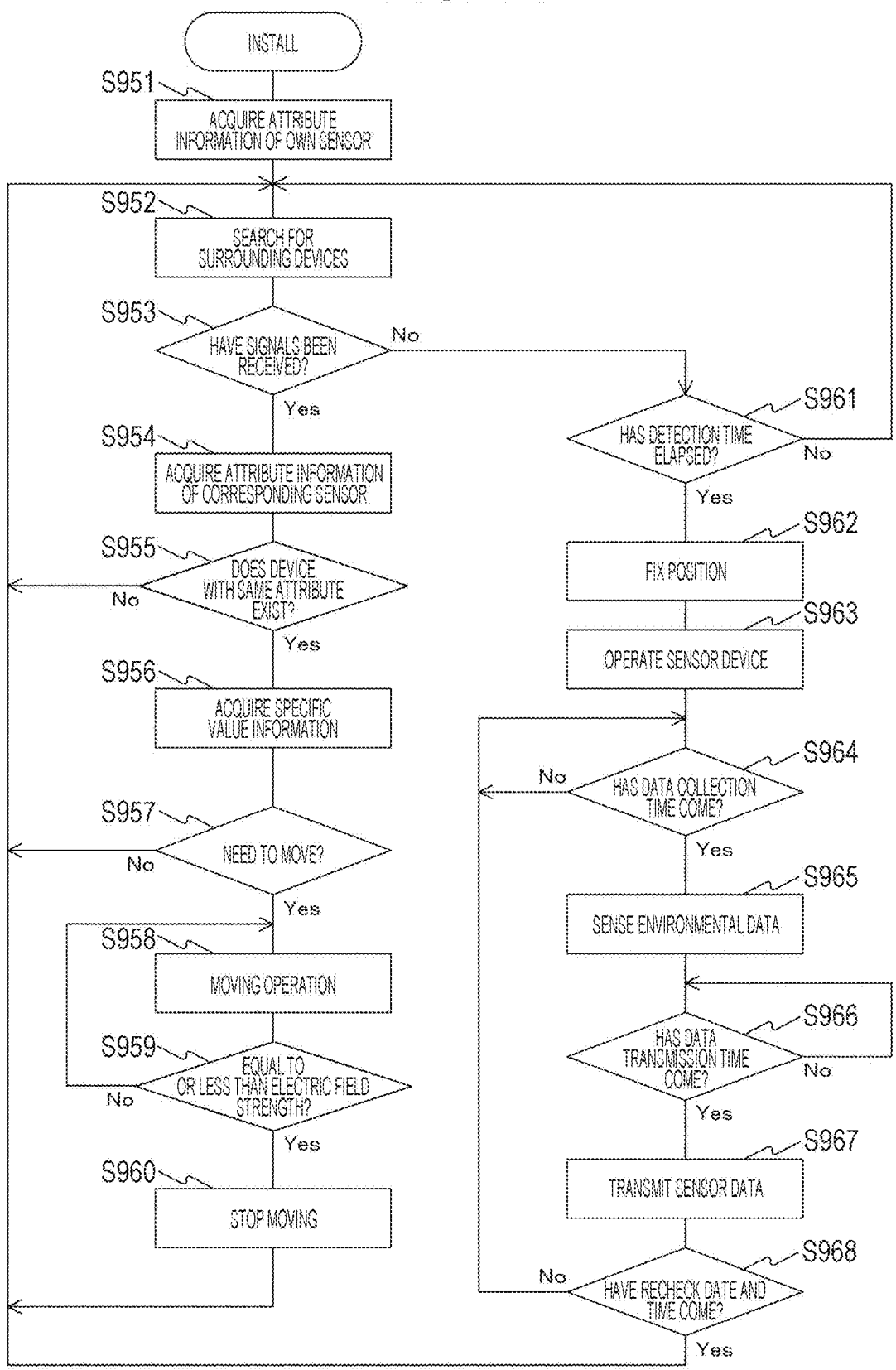
FIG. 14 is a flowchart showing a processing procedure of a third installation example of a sensor device 100 according to an embodiment of the present technology.

FIG. 14 is a flowchart showing a processing procedure of a third installation example of the sensor device 100 according to the embodiment of the present technology. The third installation example shows a case in which the sensor device 100 actively moves and operates.

First, the own device 103 acquires the same attribute information of the sensor device 100 as that of the own device 103 (step S951). Then, the own device 103 carries out a search by operating the signal reception unit 131 to receive signals transmitted from the other devices 104 therearound (step S952).

Herein, in a case where the signal reception unit 131 receives the signals (step S953: Yes), the own device 103 acquires attribute information of the other devices 104 included in a data frame thereof (step S954), and determines whether or not the attribute information is the same as that of the own device 103 (step S955).

When the own device 103 identifies existence of the other devices 104 having the same attribute as that of the own device 103, the own device 103 acquires specific value information (step S956) and determines whether or not to move (step S957). This determination on whether or not to move based on the specific value information is similar to that in the first installation example described above, and thus description thereof is omitted.

Herein, in a case where it is determined that the own device 103 needs to move (step S957: Yes), the own device 103 operates the moving devices 150 (step S958), and repeats the operation until the own device 103 reaches a position at which the signals have a predetermined received electric field strength or less (step S959: No). Then, in a case where the signals have the predetermined received electric field strength or less (step S959: Yes), the own device 103 stops the moving devices 150 (step S960), and then searches for other devices 104 in the surrounding area again (step S952). This is a configuration in which a moving range thereof can be specified by assuming time required for active movement.

Meanwhile, in a case where the other devices 104 having the same attribute do not exist (step S955: No) or in a case where it is determined that the own device 103 does not need to move (step S957: No), the own device 103 searches for other devices 104 in the surrounding area again (step S952).

Further, in a case where the own device 103 does not receive signals from the other devices 104 (step S953: No), the own device 103 continues a search for other devices 104 in the surrounding area again (step S952) until the predetermined detection time elapses (step S961: No).

When the predetermined detection time has elapsed (step S961: Yes), the position of the own device 103 is fixed (step S962). Then, the own device 103 starts operation as the sensor device 100, and measures environmental data by using the sensor 110 (step S963).

Then, when a data collection timing comes (step S964: Yes), the own device 103 senses environmental data by using the sensor 110 (step S965). Then, when a data transmission timing comes (step S966: Yes), the own device 103 transmits the collected sensor data (step S967). Thereafter, the own device 103 senses data (step S965) every time when the data collection timing comes (step S964: Yes), and transmits the data (step S967) every time when the data transmission timing comes (step S966: Yes).

Furthermore, when the recheck date and time at which the own device 103 determines whether or not to move comes (step S968: Yes), the own device 103 carries out a search again by receiving signals transmitted from the other devices 104 existing therearound (step S952).

As described above, according to the embodiment of the present technology, the own sensor device 100 can be installed at an appropriate position by fixing the position of the own sensor device 100 in accordance with a detection result of the sensor devices 100 in the surrounding area and performing sensing.

That is, because the sensor device 100 includes the fixing device 160, it is possible to operate the sensor device 100 in a case where the sensor device 100 reaches a desired place. Further, it is possible to uniformly distribute the sensor devices 100 in a space by receiving signals from the same type of sensor devices 100 and fixing the position of the own sensor device 100 in a case where it is detected that the own sensor device 100 exists at a position at which the density of the sensor devices 100 is low. Further, because each sensor device 100 includes the moving devices 150, it is possible to uniformly arrange the sensor devices 100 in the space. This makes it possible to easily collect necessary environmental data.

Further, in a case where the sensor device 100 scans signals from sensor devices 100 in the surrounding area and detects the signals, the sensor device 100 moves by using the moving devices 150, and, in a case where the sensor device 100 does not detect the signals or levels of the signals are equal to or less than a predetermined value, the sensor device 100 stays at that position. Therefore, the sensor device 100 can move to an area where other sensor devices 100 do not exist. Because the sensor device 100 moves by using the moving devices 150, the sensor device 100 can be installed even in a place that a person cannot enter. As described above, it is possible to automatically arrange a new sensor device 100 at a position at which sensors are sparse, without being conscious of time and effort to install the sensor device 100.

Note that the above embodiment shows an example for embodying the present technology, and the matters in the embodiment and the matters specifying the invention in the claims have a corresponding relationship. Similarly, the matters specifying the invention in the claims and the matters in the embodiment of the present technology represented by the same names as those in the matters specifying the invention in the claims have a corresponding relationship. However, the present technology is not limited to the embodiment, and can be embodied by applying various modifications to the embodiment within the gist thereof.

Further, the processing procedures described in the above embodiment may be regarded as a method having a series of the above procedures, or may be regarded as a program for causing a computer to execute the series of procedures or a recording medium storing the program. The recording medium can be, for example, a compact disc (CD), a MiniDisc (MD), a digital versatile disc (DVD), a memory card, a Blu-ray (registered trademark) disc, or the like.

Note that the effects described in this specification are merely examples, are not limited, and may have other effects.

Note that the present technology may also have the following configurations.

(1) A sensor device including:
a device detection unit configured to perform operation of detecting another sensor device in a surrounding area and generate a detection result of the operation;
a position fixing unit configured to fix a position of an own sensor device on the basis of the detection result;
a sensor unit configured to sense environmental data at the position; and
a transmission unit configured to transmit the sensed data.

(2) The sensor device according to (1), further including:
a position moving unit configured to move the position of the own sensor device on the basis of the detection result.

(3) The sensor device according to (2), in which
the position moving unit moves until its moving amount reaches a predetermined moving amount.

(4) The sensor device according to any one of (1) to (3), in which
in a case where the another sensor device does not exist in the surrounding area, the device detection unit generates a detection result showing that the position of the own sensor device is to be fixed.

(5) The sensor device according to any one of (1) to (3), in which
in a case where distribution density of the other sensor devices in the surrounding area is low, the device detection unit generates a detection result showing that the position of the own sensor device is to be fixed.

(6) The sensor device according to any one of (1) to (3), in which
the device detection unit detects whether or not the another sensor device exists in the surrounding area on the basis of a received electric field strength of a signal transmitted from the another sensor device in the surrounding area.

(7) The sensor device according to any one of (1) to (6), in which
the device detection unit performs operation of detecting the another sensor device in the surrounding area in accordance with an operation status of one or more of the other sensor devices having the same attribute as an attribute of the own sensor device.

(8) The sensor device according to any one of (1) to (6), in which
the device detection unit generates a detection result of whether or not to fix the position of the own sensor device on the basis of identification information of the another sensor device.

(9) The sensor device according to any one of (1) to (6), in which
the device detection unit generates a detection result of whether or not to fix the position of the own sensor device on the basis of installation times of the own sensor device and the another sensor device.

(10) The sensor device according to any one of (1) to (6), in which
the device detection unit generates a detection result of whether or not to fix the position of the own sensor device on the basis of a random number.

(11) The sensor device according to any one of (1) to (10), in which
the transmission unit transmits, as a frame, a signal including information regarding a mounted sensor.

(12) The sensor device according to any one of (1) to (11), in which
the device detection unit receives a signal transmitted as a frame from the another sensor device in the surrounding area and performs operation of detecting the another sensor device on the basis of information regarding a sensor included in the frame.

(13) The sensor device according to any one of (1) to (12), in which
the transmission unit transmits the data sensed at predetermined time intervals.

(14) The sensor device according to any one of (1) to (13), in which
the sensor unit senses the data at predetermined time intervals.

(15) The sensor device according to any one of (1) to (14), in which in a case where the device detection unit does not detect the another sensor device for a time period equal to or longer than a predetermined time interval, the device detection unit generates a detection result showing that the another sensor device does not exist in the surrounding area.

(16) The sensor device according to any one of (1) to (15), in which in a case where a predetermined recheck date and time comes, the device detection unit detects the another sensor device again.

(17) A method of processing a sensor device, the method including:

a device detection procedure of performing operation of detecting another sensor device in the surrounding area and generating a detection result of the operation;

a position fixing procedure of fixing a position of an own sensor device on the basis of the detection result;

a sensing procedure of sensing environmental data at the position; and a transmission procedure of transmitting the sensed data.

(18) The method of processing a sensor device according to (17), in which in a case where the another sensor device exists in the surrounding area, the own sensor device is moved to a position at which the another sensor device does not exist in the surrounding area and is operated.

(19) A sensor network system, in which in a case where a second sensor device does not exist around a first sensor device, a position of the first sensor device is fixed, and the first sensor device collects data by sensing.

REFERENCE SIGNS LIST

100 Sensor device
110 Sensor
111 Device position detection unit
112 Environmental sensor unit
130 Wireless communication device
131 Signal reception unit
132 Signal transmission unit
150 Moving device
151 Device position moving unit
160 Fixing device
161 Device position fixing unit
171 Data analysis unit
172 Data construction unit
191 Device control unit
200 Base station
300 Data center
400 Internet network

The invention claimed is:

1. A first sensor device, comprising:
a memory configured to store instructions;
a processor configured to execute the instructions;
a signal reception unit configured to:
acquire a first attribute associated with the first sensor device; and
acquire a second attribute for each of a plurality of second sensor devices;
a device detection unit configured to:
detect at least one second sensor device of the plurality of second sensor devices is in a surrounding area, wherein the surrounding area surrounds the first sensor device;
generate a detection result based on the detection of the at least one second sensor device and installation times of each of the first sensor device and the at least one second sensor device; and
compare the second attribute of the at least one second sensor device with the first attribute associated with the first sensor device;
a position fixing unit configured to fix, based on the detection result and the second attribute of the at least one second sensor device being different from the first attribute, a position of the first sensor device;
a sensor unit configured to sense environmental data at the position; and
a transmission unit configured to transmit the sensed environmental data.

2. The first sensor device according to claim 1, further comprising a position moving unit configured to move the position of the first sensor device based on the second attribute of the at least one second sensor device is same as the first attribute.

3. The first sensor device according to claim 2, wherein the position moving unit is further configured to move the position of the first sensor device by a specific moving amount.

4. The first sensor device according to claim 1, wherein based on the at least one second sensor device that does not exist in the surrounding area, the detection result indicates that the position of the first sensor device is to be fixed.

5. The first sensor device according to claim 1, wherein based on a low distribution density of the plurality of second sensor devices in the surrounding area, the detection result indicates that the position of the first sensor device is to be fixed.

6. The first sensor device according to claim 1, wherein the signal reception unit is further configured to receive a signal from the at least one second sensor device, and the device detection unit is further configured to detect, based on an electric field strength of the received signal, that the at least one second sensor device is in the surrounding area.

7. The first sensor device according to claim 1, wherein the device detection unit is further configured to detect, based on an operation status of the at least one second sensor device, that the at least one second sensor device is in the surrounding area.

8. The first sensor device according to claim 1, wherein the device detection unit is further configured to generate, based on identification information of the at least one second sensor device, the detection result to fix the position of the first sensor device.

9. The first sensor device according to claim 1, wherein the device detection unit is further configured to generate, based on a random number, the detection result to fix the position of the first sensor device.

10. The first sensor device according to claim 1, further comprising a mounted sensor, wherein the transmission unit is further configured to transmit, as a frame, a signal including information associated with the mounted sensor.

11. The first sensor device according to claim 1, wherein the device detection unit is further configured to:
receive, as a frame, a signal from the at least one second sensor device; and
detect the at least one second sensor device based on information associated with a sensor included in the at least one second sensor device, and
the information is included in the frame.

12. The first sensor device according to claim 1, wherein the transmission unit is further configured to transmit the sensed environmental data at specific time intervals.

13. The first sensor device according to claim 1, wherein the sensor unit is further configured to sense the environmental data at specific time intervals.

14. The first sensor device according to claim 1, wherein based on the at least one second sensor device is not detected for a time period equal to or longer than a specific time interval, the detection result indicates that the at least one second sensor device does not exist in the surrounding area.

15. The first sensor device according to claim 1, wherein the device detection unit is further configured to detect, based on a specific recheck date and time, the at least one second sensor device.

16. A method, comprising:
in a first sensor device:
acquiring a first attribute associated with the first sensor device;
acquiring a second attribute of each of a plurality of second sensor devices;
detecting at least one second sensor device of the plurality of second sensor devices is in a surrounding area, wherein the surrounding area surrounds the first sensor device;
generating a detection result based on the detection of the at least one second sensor device and installation times of each of the first sensor device and the at least one second sensor device;
compare the second attribute of the at least one second sensor device with the first attribute associated with the first sensor device;
fixing, based on the detection result and the second attribute of the at least one second sensor device being different from the first attribute, a first position of the first sensor device;
sensing environmental data at the first position; and
transmitting the sensed environmental data.

17. The method according to claim 16, wherein based on the at least one second sensor device is in the surrounding area, the first sensor device is moved to a second position at which the at least one second sensor device does not exist in the surrounding area.

18. A sensor network system, comprising:
a memory configured to store instructions;
a processor configured to execute the instructions;
a first sensor device that comprises:
a signal reception unit configured to:
acquire a first attribute associated with the first sensor device; and
acquire a second attribute of each of a plurality of second sensor devices;
a device detection unit configured to:
detect the second attribute of at least one second sensor device of the plurality of second sensor devices is different from the first attribute associated with the first sensor device;
determine, based on the detection that the second attribute of the at least one second sensor device is different from the first attribute, that the at least one second sensor device does not exist around the first sensor device; and
generate a detection result based on installation times of each of the first sensor device and the at least one second sensor device;
a position fixing unit configured to fix, based on the detection result and the determination that the at least one second sensor device does not exist around the first sensor device, a position of the first sensor device;
a sensor unit configured to sense environmental data at the position; and
a transmission unit configured to transmit the sensed environmental data.

* * * * *